United States Patent [19]
Hoke

[11] Patent Number: 5,987,207
[45] Date of Patent: Nov. 16, 1999

[54] FIBER ORGANIZER

[75] Inventor: Jeffrey A. Hoke, Grapevine, Tex.

[73] Assignee: Siecor Corporation, Hickory, N.C.

[21] Appl. No.: 08/884,280

[22] Filed: Jun. 27, 1997

[51] Int. Cl.[6] .................................................. G02B 6/36
[52] U.S. Cl. ................................................................ 385/135
[58] Field of Search ..................................... 385/134–137

[56] References Cited

U.S. PATENT DOCUMENTS

| | | | |
|---|---|---|---|
| 4,792,203 | 12/1988 | Nelson et al. | 385/135 |
| 5,066,149 | 11/1991 | Wheeler et al. | 385/135 |
| 5,167,001 | 11/1992 | Debortoli et al. | 385/135 |
| 5,383,051 | 1/1995 | Delrosso et al. | 385/135 |
| 5,402,515 | 3/1995 | Vidacovich et al. | 385/135 |
| 5,469,526 | 11/1995 | Rawlings | 385/135 |
| 5,515,200 | 5/1996 | Delrosso et al. | 385/135 |
| 5,596,670 | 1/1997 | Debortoli et al. | 385/135 |
| 5,668,911 | 9/1997 | Debortoli | 385/135 |
| 5,802,237 | 9/1998 | Pulido | 385/135 |

*Primary Examiner*—Hemang Sanghavi

[57] ABSTRACT

The fiber organizer includes a tray for supporting at least one optical fiber within a housing, such as an optical receiver node. The fiber organizer also includes means for defining a raceway along which the optical fiber is routed. The raceway can be defined by inner and outer walls which extend outwardly from the tray in order to guide the optical fiber along the raceway in a manner which prevents the fiber from being excessively bent. In order to provide access to components disposed beneath the fiber organizer, the tray can include a hinge to permit a first portion of the tray to be pivoted relative to a second portion of the tray. The tray can also define one or more openings aligned with respective test ports of the electrical circuitry which lies beneath the fiber organizer. A technician can therefore establish electrical contact with the test ports while the tray remains in position within the housing. The fiber organizer can also include a receptacle for cooperably engaging and storing a spare connector so as to facilitate reconnectorization or other repair of the optical fibers.

14 Claims, 4 Drawing Sheets

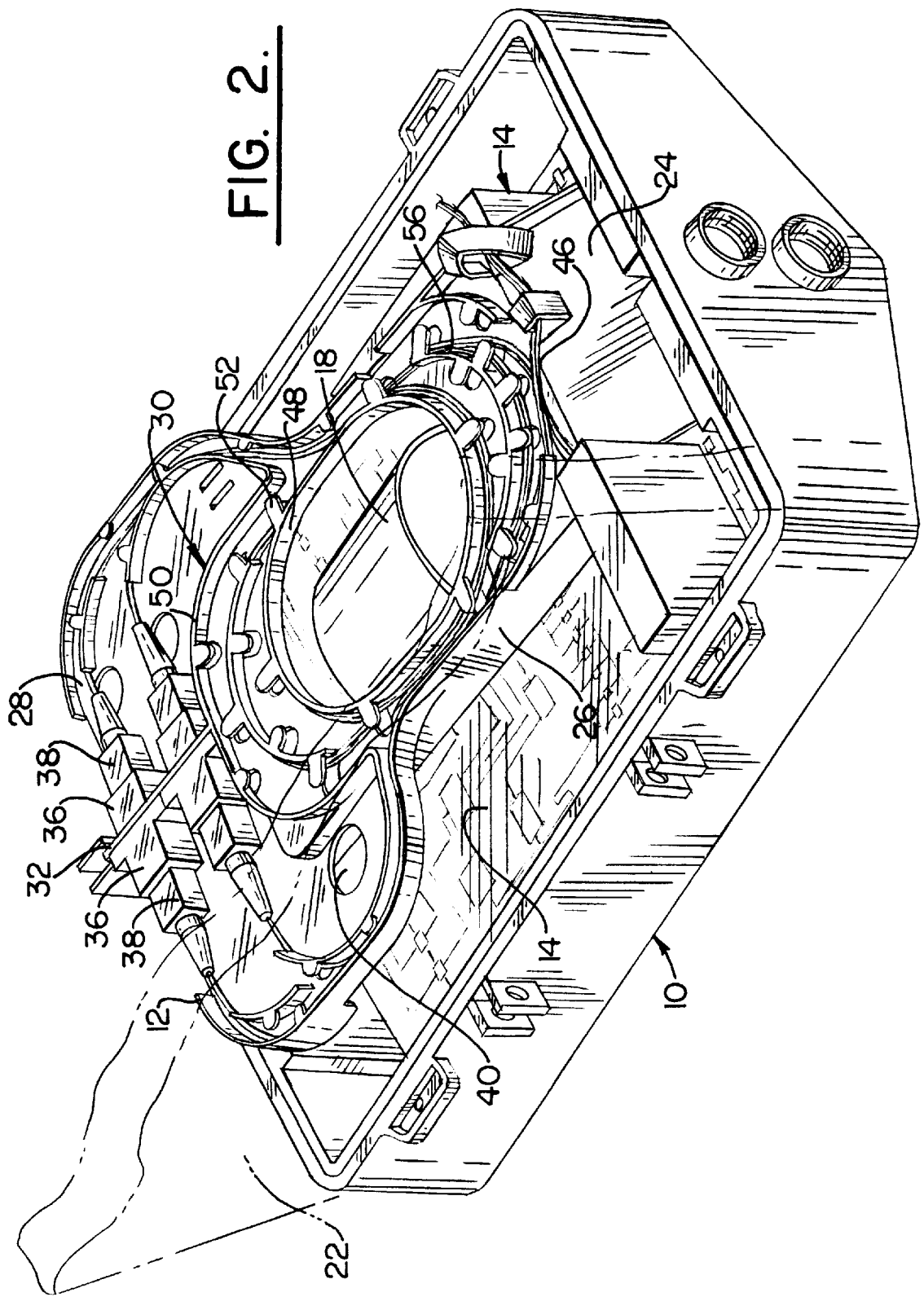

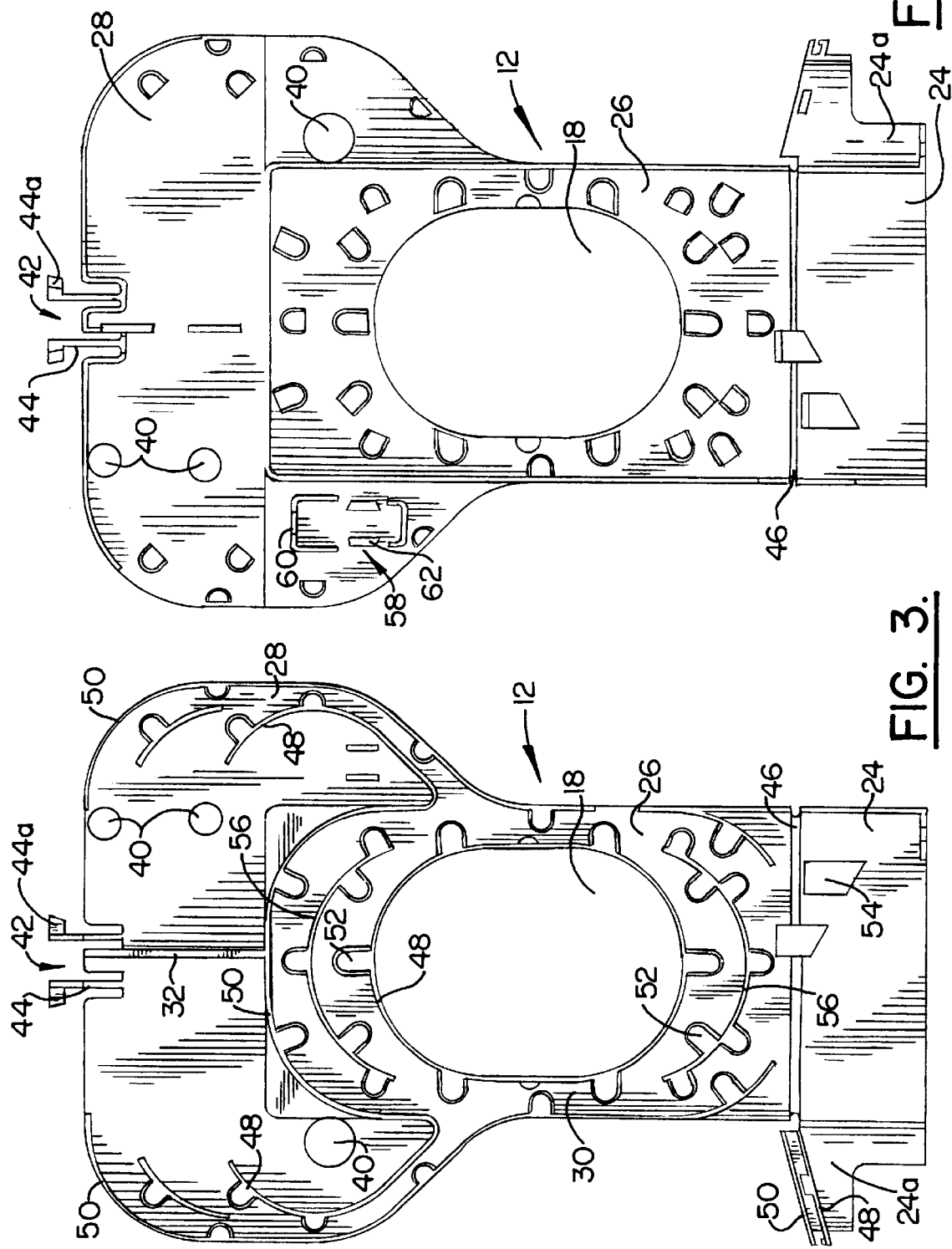

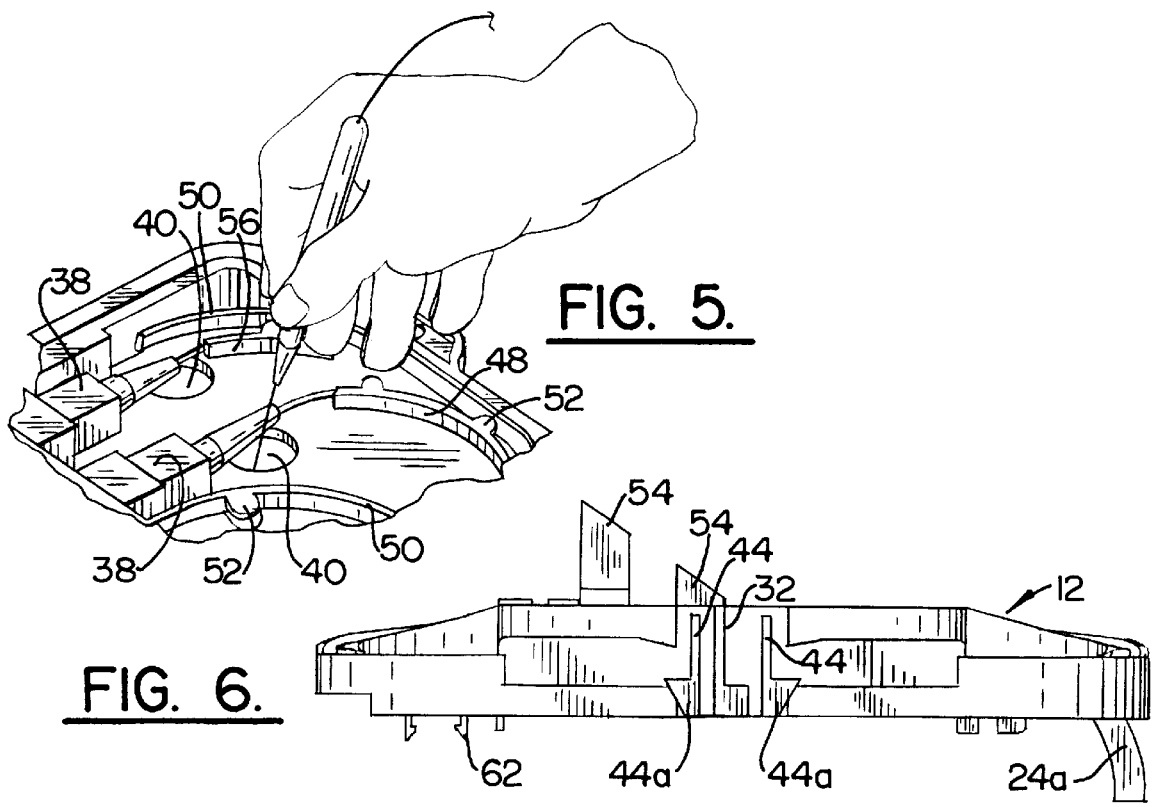
FIG. 5.
FIG. 6.
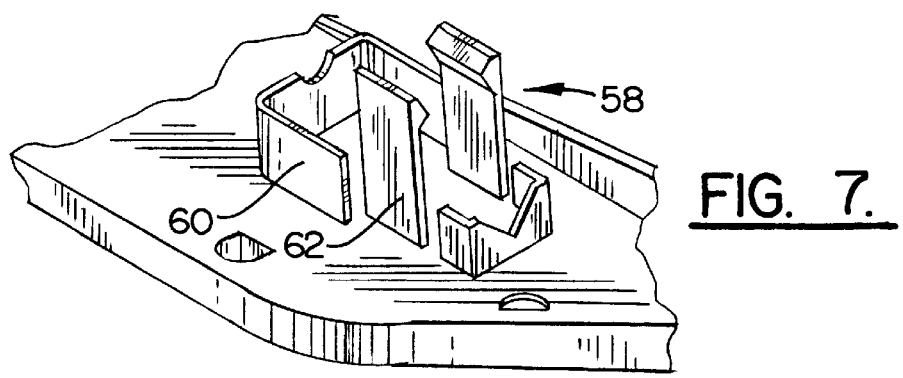
FIG. 7.

FIBER ORGANIZER

BACKGROUND OF THE INVENTION

Fiber optic networks oftentimes include a number of nodes or housings through which one or more optical fibers extend. Within each of these housings, it is desirable for the optical fibers to be routed or managed in a controlled fashion to reduce snarling of the optical fibers and to facilitate access to the other components within the housing. For example, many fiber optic networks include optical receiver nodes in which incoming optical signals transmitted via one or more optical fibers are converted to electrical signals prior to subsequent processing and/or further transmission. As known to those skilled in the art, optical receiver nodes are commonly mounted on the exterior of buildings or on utility poles so as to convert optical signals which have typically been optically transmitted over long distances by one or more optical fibers to electrical signals for subsequent distribution throughout the building. Optical receiver nodes therefore generally include one or more printed circuit boards mounted within the housing for converting the optical signals delivered by the optical fibers to corresponding electrical signals and for thereafter electronically processing the signals, if so desired.

In order to provide some form of optical fiber management, conventional optical receiver nodes typically include a fiber organizer. A conventional fiber organizer includes a metal plate mounted within the housing. The conventional fiber organizer includes a slack loop defined by a number of fingers extending upwardly from the metal plate such that excess or slack lengths of optical fiber can be wrapped about the fingers in order to provide excess optical fiber, such as for reconnectorization or other reworking of the optical fiber. In order to secure the optical fiber in position, each finger generally includes a flange portion that extends over the optical fiber for preventing the optical fiber from slipping off of the finger or otherwise becoming dislodged. Since the slack loop of a conventional fiber organizer is defined by a number of fingers, typically about eight fingers, spaced about the circumference of the slack loop, the optical fiber is forced to bend somewhat as the optical fiber is looped about the fingers. Thus, the slack loop defined by the upwardly extending fingers is not a smooth curve, but is, instead, formed by a number of discrete, almost linear, segments.

While the slack loop defined by a conventional fiber organizer prevents the optical fibers from being bent excessively, the conventional fiber organizer did not provide similar radius control for those portions of the optical fibers leading into or out of the slack loop. Thus, the portions of the optical fibers leading into and out of the slack loop could be excessively bent, thereby damaging the transmission characteristics of the optical fibers. Moreover, the portions of the optical fibers leading into and out of the slack loop oftentimes hung or otherwise extended over the printed circuit boards within an optical receiver node. As such, the optical fibers limited access to the printed circuit boards, such as by limiting access to the test ports defined by the printed circuit boards which otherwise would permit a technician to evaluate the performance of the optical receiver node.

A conventional fiber organizer also generally includes a bulkhead extending upwardly from one end of the fiber organizer. The bulkhead defines a single window for receiving a connector sleeve in which a pair of connectors, such as a pair of SC connectors, can be mated. By permitting the interconnection of only a single pair of connectors, however, a conventional fiber organizer effectively limits the number of optical fibers which can be managed thereby.

While the printed circuit boards are generally arranged about the periphery of the fiber organizer within a conventional optical receiver node, the fiber organizer does overlie at least some portions of the printed circuit boards. In addition, the fiber organizer typically overlies the power supply within a conventional optical receiver node. As such, the fiber organizer must be removed each time the power supply is serviced or is otherwise accessed. Since the fiber organizer is generally mounted within the node by two or more fasteners, such as two or more bolts, removal of a conventional fiber organizer is somewhat time consuming and must be performed in a careful manner in order to protect the optical fibers from excessive strain or other undesirable forces which could potentially disconnect the optical fibers from the associated printed circuit boards. Therefore, even though fiber organizers have been developed for managing, i.e., routing, the optical fibers within a housing, such as an optical receiver node, conventional fiber organizers suffer from a number of deficiencies which limit their effectiveness as described above.

SUMMARY OF THE INVENTION

It is therefore an object of the present invention to provide a fiber organizer which fully guides, supports and protects the optical fibers within a housing, such as an optical receiver node.

It is another object of the present invention to provide a fiber organizer which permits ready access to components disposed beneath the fiber organizer.

It is yet another object of the present invention to provide a fiber organizer which permits ready access to test ports and other contact points underlying the fiber organizer without requiring the fiber organizer to be displaced.

It is a further object of the present invention to provide a fiber organizer which accommodates at least one spare connector to facilitate reconnectorization of the optical fibers.

These and other objects are provided, according to the present invention, by a fiber organizer which includes a tray for supporting at least one optical fiber and means for defining a raceway along which the optical fiber is routed. According to one advantageous embodiment, the means for defining the raceway includes inner and outer walls extending outwardly from the tray for defining the raceway therebetween. According to this embodiment, the fiber organizer also includes a number of flanges extending into the raceway from both the inner and outer walls to secure the optical fiber within the raceway. Since the inner and outer walls extend continuously between adjacent flanges, the fiber organizer of this advantageous embodiment guides the optical fiber along the raceway in a manner which prevents the fiber from being excessively bent.

The inner and outer walls preferably extend outwardly from an intermediate portion of the tray to define a slack loop. In addition, the tray also preferably includes a connector portion and a fiber entry portion on opposed sides of the intermediate portion. As such, the optical fiber enters the slack loop from the fiber entry portion and exits the slack loop at the connector portion. In order to further protect the optical fibers from excessive bending, the fiber organizer of one advantageous embodiment includes fiber retention means, mounted upon the fiber entry portion and the connector portion, for controllably routing the optical fiber to and from the slack loop. Therefore, the fiber organizer of this embodiment fully guides and protects all portions of the optical fiber from the point of connection of one end of the optical fiber with the electrical circuitry within the housing, such as an optical receiver node, to the fiber optic connector mounted upon the opposed end portion of the optical fiber.

The fiber organizer of one advantageous embodiment also includes an intermediate wall extending outwardly from the tray between the inner and outer walls to thereby define first and second raceways. The fiber organizer of this embodiment can also include a number of flanges extending in opposed directions from the intermediate wall to thereby extend into both of the first and second raceways. Since the first and second raceways have different lengths, this embodiment of the fiber organizer can readily accommodate optical fibers of a number different lengths by routing the optical fibers along either one or both of the raceways in order to store the necessary length of excess fiber.

In order to provide access to components disposed beneath the fiber organizer, the tray can include a hinge to permit a first portion of the tray to be pivoted relative to a second portion of the tray. Typically, the second portion of the tray, such as the fiber entry portion, can be mounted to the housing. Since the tray of this advantageous embodiment includes a hinge, however, the first portion of the tray, namely, the intermediate portion and the connector portion, can be pivoted outwardly such that a technician can access the components lying beneath the tray.

The tray of another advantageous embodiment of the fiber organizer can also define one or more openings aligned with respective predetermined ports of the electrical circuitry. As such, electrical contact can be established with the predetermined ports of the electrical circuitry, such as test ports or other contact points, while the tray remains in position within the housing. Thus, the tray of this advantageous embodiment need not be pivoted upwardly or otherwise moved in order to access the ports of the electrical circuitry exposed through the openings defined by the tray.

The fiber organizer of another advantageous embodiment includes a receptacle for cooperably engaging a spare connector. More specifically, the tray of this embodiment includes a first surface upon which the raceway is defined and an opposed second surface upon which the receptacle is mounted. Preferably, the receptacle includes a wall extending outwardly from the second surface of the tray to define a cavity sized to snugly receive the spare connector. The receptacle can also include a clip having a pair of opposed arms for securely engaging the spare connector. As such, the fiber organizer can retain a spare connector on the underside of the tray to facilitate reconnectorization or other repair of the optical fibers.

Therefore, the fiber organizer of the present invention provides raceways defined between inner and outer walls from guiding the optical fibers from their entry onto the fiber organizer to a connector mounted upon an end portion of the optical fiber in order to prevent excessive bending of any portion of the optical fiber. By providing multiple raceways, the fiber organizer also provides increased fiber management capabilities by permitting various slack lengths of optical fiber to be readily stored. In addition, the fiber organizer is advantageously designed to permit access to components disposed beneath the tray, such as by lifting the hinged portion of the tray outwardly from the housing or by probing test ports exposed through openings defined by the tray. Finally, the fiber organizer permits ready reconnectorization or other repair of the optical fiber by including a receptacle for storing a spare connector, typically on the underside of the tray.

BRIEF DESCRIPTION OF THE DRAWINGS

FIG. 2 is a perspective view of the optical receiver node of FIG. 1 in which a portion of the tray of the fiber organizer has been pivoted outwardly to permit access to the components disposed beneath the tray.

FIG. 3 is a plan view of the surface of the fiber organizer illustrated in FIGS. 1 and 2.

FIG. 4 is a plan view of the surface of the fiber organizer, opposite the surface illustrated in FIG. 3, which includes a receptacle for storing a spare connector.

FIG. 5 is a fragmentary perspective view of a portion of the fiber organizer illustrated in FIG. 1 which depicts the insertion of a test probe through an opening defined by the tray of the fiber organizer.

FIG. 6 is an end view of the connector portion of the fiber organizer illustrated in FIGS. 3 and 4.

FIG. 7 is a fragmentary perspective view of a portion of the surface of the fiber organizer shown in FIG. 4 which more clearly depicts the receptacle for storing a spare connector.

DETAILED DESCRIPTION OF THE INVENTION

Figure 1:
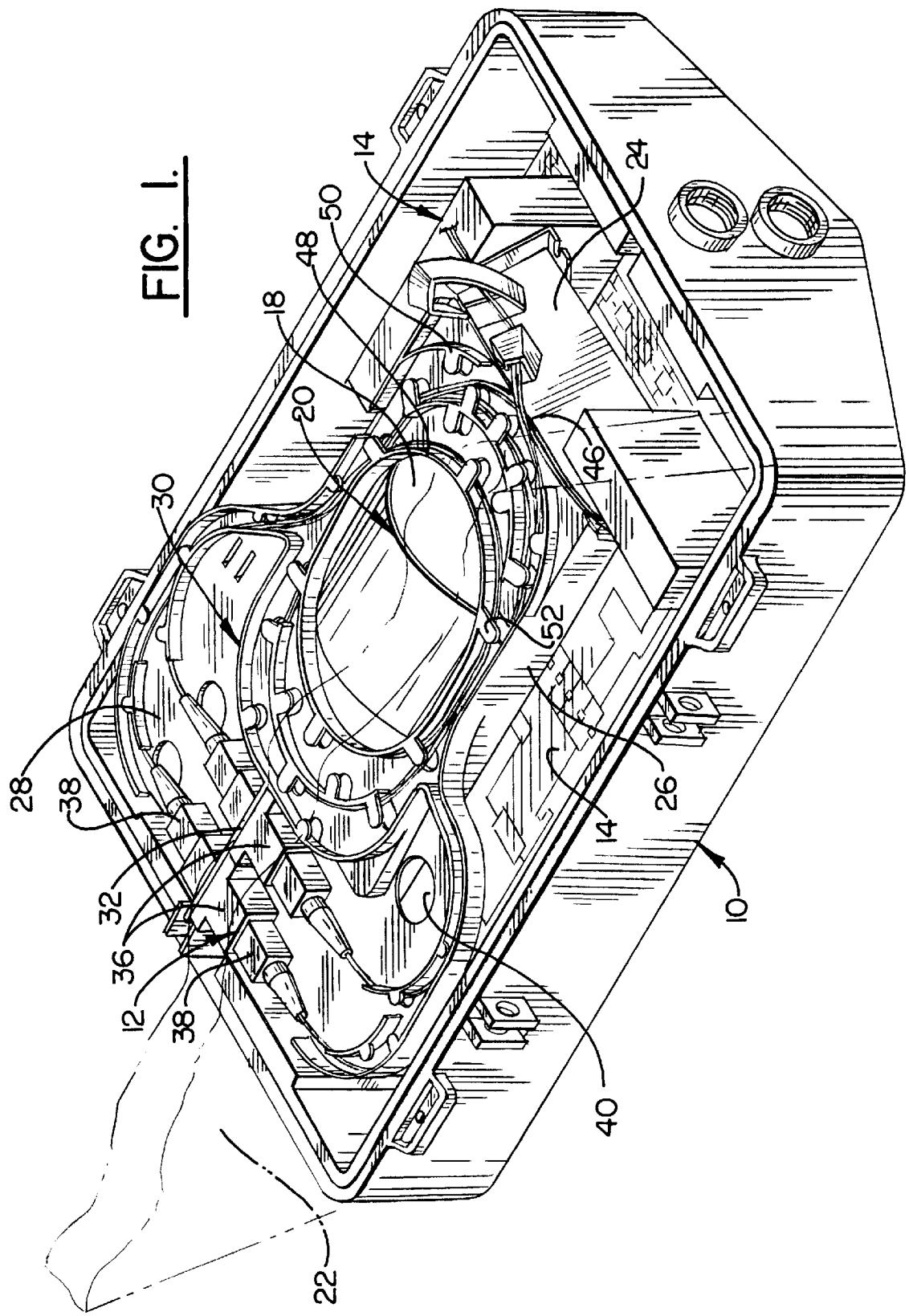
FIG. 1 is a perspective view of an optical receiver node including a fiber organizer according to one embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, an optical receiver node 10 is illustrated which includes a fiber organizer 12 according to one advantageous embodiment of the present invention. Although the fiber organizer is mounted within an optical receiver node for purposes of illustration and description, the fiber organizer can be mounted in a variety of other housings or nodes without departing from the spirit and scope of the present invention. With respect to FIG. 1, the optical receiver node also includes a number of printed circuit boards 14 disposed about the periphery of the fiber organizer and extending at least somewhat beneath the fiber organizer. As known to those skilled in the art, the printed circuit boards include electrical components, such as filters and equalizers, for converting incoming optical signals to corresponding electrical signals for subsequent processing and/or transmission, such as via the electrical wiring within a building.

Although not illustrated in FIG. 1, the optical receiver node 10 generally includes a power supply disposed, at least in large part, beneath the fiber organizer 12. As shown, the fiber organizer generally defines a relatively large central opening 18 through which one or more metallic springs 20 extend. As known to those skilled in the art, the metallic springs are typically electrically connected to a reference voltage, such as ground, and extend through the opening defined in an intermediate portion of the fiber organizer in order to electrically contact and, therefore, ground the lid 22 of the optical receiver node as the lid is closed.

As illustrated in more detail in FIGS. 3 and 4, the fiber organizer 12 includes a tray having a fiber entry portion 24, an intermediate portion 26 and a connector portion 28. The intermediate portion defines a slack loop 30 extending about the opening 18 through which the ground spring 20 extends. By coiling optical fiber about the slack loop, the fiber organizer can provide excess lengths of optical fiber for reconnectorization or other repair of the optical fiber.

The fiber entry portion 24 of the tray receives at least two different optical fibers. A first optical fiber enters the optical receiver node 10 from the exterior and carries the incoming optical signals. In contrast, the second optical fiber extends upwardly from the printed circuit boards 14 disposed within the optical receiver node and serves to couple the optical signals to the printed circuit boards for conversion to corresponding electrical signals. In order to permit reconnectorization or other repair of the optical fibers, excess lengths of both optical fibers are then coiled about the slack loop 30 and end portions of the optical fibers are delivered to the connector portion for interconnection.

The connector portion 28 includes a bulkhead 32 extending upwardly from the tray. The bulkhead defines at least one and, more preferably, two windows 34 through which respective connectors sleeves 36 extend. As known to those skilled in the art and as shown in FIGS. 1 and 2, a pair of connectors 38 can be mated within each of the connector sleeves in order to appropriately connect end portions of the first and second optical fibers. Once connected, the optical signals carried by the first optical fiber can be delivered to the printed circuit boards via the second optical fiber for conversion to corresponding electrical signals. While the windows defined by the bulkhead of the connector portion can be sized to receive any of a variety of connector sleeves, the window defined by the bulkhead of the fiber organizer of one advantageous embodiment is adapted to receive and engage an SC connector sleeve in which a pair of SC connectors is interconnected.

As shown in FIGS. 1 and 2, the fiber organizer 12 of the present invention preferably includes a bulkhead 32 which defines two or more windows 34, each of which can receive a corresponding connector sleeve 36 in which a pair of connectors 38 is interconnected. In contrast to conventional fiber organizers, the fiber organizer of the present invention therefore permits the interconnection of two or more pairs of optical fibers. As such, the fiber management capabilities of the fiber organizer are increased since the fiber organizer can controllably route and interconnect two or more pairs of optical fibers in order to provide additional or redundant optical communication paths.

The available space within an optical receiver node 10 is generally quite limited. Thus, the tray of one advantageous embodiment preferably has two or more levels. In this regard, the intermediate portion 26 of the tray generally defines a reference plane. Since the connectors 38 as well as the connector sleeves 36 are generally relatively large in comparison to the thickness of the intermediate portion of the tray, the connector portion 28 of the tray is preferably offset from the reference plane such that the resulting tray has at least two levels. In particular, the connector portion of the tray of this advantageous embodiment is offset downwardly or recessed relative to the reference plane defined by the intermediate portion so as to be positioned closer to the printed circuit boards 14 once the fiber organizer 12 is mounted within the optical receiver node. By offsetting the connector portion relative to the intermediate portion, the connectors mounted upon the end portions of the optical fibers and the connector sleeves extending through the windows 34 defined by the bulkhead 32 do not extend outwardly beyond other portions of the fiber organizer. As such, the overall profile of the fiber organizer is generally reduced, while judicially utilizing the available space within the optical receiver node.

The electrical circuitry which is typically mounted upon one or more printed circuit boards 14 within the optical receiver node 10 generally defines one or more test ports or other contact points which can be probed, such as by a technician during troubleshooting of the optical receiver node. Although some of the test ports are located on portions of the printed circuit boards adjacent to the fiber organizer 12, at least some of the test ports are oftentimes located on portions of the printed circuit board which underlie or are covered by the fiber organizer. In order to prevent the technician from having to remove the fiber organizer each time that electrical contact is to be established with a test port, the tray of the fiber organizer of one advantageous embodiment defines one or more openings 40 aligned with respective ones of the test ports which lie beneath the fiber organizer. Thus, a technician can probe or otherwise make electrical contact with the test port without having to remove or reposition the fiber organizer as shown in FIG. 1. In order to permit the test probe to be inserted through the opening, the openings generally have a diameter of at least a quarter inch and, more preferably, of at least about one half inch. In addition, the openings are generally circular in shape in order to further facilitate probing of the exposed test points.

Even though test ports can be accessed via the openings 40 defined by the tray of the fiber organizer 12 of one advantageous embodiment, the fiber organizer must sometimes be removed in order to service, replace or otherwise repair components which lie beneath and are covered by the fiber organizer. For example, the power supply which is typically disposed beneath the fiber organizer must be serviced or replaced periodically. According to one embodiment of the present invention, a first portion of the tray, such as the fiber entry portion 24, is generally fastened or otherwise secured to the housing or the printed circuit boards 14 mounted within the housing, such as by two or more bolts. However, the second portion of the fiber organizer which typically includes the intermediate portion 26 and the connector portion 28 is preferably connected to the housing by a clip 42. Although the clip can be formed in a variety of fashions, the clip of the embodiment illustrated in FIGS. 1–4 and 6 is formed by a pair of arms 44 having enlarged distal portions 44a for engaging a corresponding aperture defined by the housing.

As further shown by FIG. 2, the tray of this advantageous embodiment of the fiber organizer 12 preferably includes a hinge 46 between the first portion of the tray which is securely fastened to the housing and the second portion of the tray which is merely clipped to the housing. By disengaging the clip 42, such as by compressing the arms 44 of the clip, the second portion of the tray which typically includes the intermediate portion 26 and the connector portion 28 can be disengaged from the housing and can be pivoted outwardly in order to expose those components which lie therebeneath. As such, these components can be serviced, replaced or otherwise repaired without removing the fiber organizer from the housing and without disconnecting or otherwise rerouting the optical fibers carried by the fiber organizer. While the hinge of the illustrated embodiment of the tray is formed by a region of reduced thickness, the fiber organizer can include other types of hinges without departing from the spirit and scope of the present invention.

The tray of the fiber organizer 12 has opposed first and second surfaces with the first surface generally facing the lid 22 of the optical receiver node 10 and the second surface generally facing the printed circuit boards 14 and other electrical components mounted therein. As illustrated, the fiber organizer includes means for defining at least one raceway along the first surface of the tray between the fiber entry portion 24 and the connector portion 28 along which the optical fiber is routed. Preferably, the means for defining at least one raceway includes inner and outer walls 48 and 50 extending outwardly from the first surface of the tray for defining a raceway therebetween. The fiber organizer also includes a number of flanges 52 which extend into or over the raceway from the both the inner and outer walls in order to secure the optical fiber within the raceway and to prevent the optical fiber from slipping out of the raceway. By defining the raceways with walls, such as inner and outer walls which extend between adjacent flanges, the optical fibers are protected from excessive bending and the damage to the transmission characteristics of the optical fibers which results therefrom.

As shown in FIGS. 1–3, the intermediate portion 26 of the fiber organizer 12 preferably includes inner and outer walls 48 and 50 which encircle the central opening 18 in order to define the slack loop 30. In addition, the fiber entry portion 24 of the fiber organizer preferably includes a downturned portion 24a having fiber retention means for guiding the optical fiber from a printed circuit board 14 to the slack loop. As shown, the fiber retention means of the fiber entry portion also preferably includes inner and outer walls which extend outwardly from the downturned portion for defining a raceway leading from the electrical circuitry to the slack loop. Further, the connector portion 28 of the tray preferably includes fiber retention means formed by inner and outer walls which define a number of raceways extending from the slack loop to respective windows 34 defined by the bulkhead 32. As such, the fiber organizer of the present invention fully guides the optical fibers from the electrical circuitry to the slack loop and from the slack loop to respective windows defined by the bulkhead. By fully guiding the optical fibers, the fiber organizer protects not only those portions of the optical fibers coiled about the slack loop from being bent excessively, but also the end portions of the optical fibers which extend from the electrical circuitry to the slack loop and the end portions of the optical fibers which extend from the slack loop to the bulkhead. In addition, the fiber organizer prevents the end portions of the optical fibers from extending laterally beyond the tray, i.e., hanging over the edge of the tray, such that a technician can readily access the printed circuit boards 14 and other electrical components positioned adjacent to the fiber organizer. In addition to the raceway defined by the downturned portion 24a of the fiber entry portion 24 for guiding an optical fiber from a printed circuit board 14 to the slack loop 30, the fiber retention means of the fiber entry portion can include a second raceway defined by another set of inner and outer walls 48 and 50 for receiving the optical fiber entering the optical receiver node 10 from the exterior. However, the optical fiber which enters the housing from the exterior may be coated or jacketed so as to have a diameter larger than the raceway defined by the inner and outer walls. As such, the fiber retention means of the fiber entry portion of one advantageous embodiment preferably includes one or more outwardly extending finger portions 54 capable of receiving and guiding larger optical fibers to the slack loop.

According to one embodiment, the fiber organizer 12 further includes an intermediate wall 56 extending outwardly from the tray between the inner and outer walls 48 and 50 to thereby define first and second raceways. As shown in FIGS. 1–3, the first raceway is defined between the inner wall and the intermediate wall, while the second raceway is defined between the intermediate wall and the outer wall. In order to further secure the optical fiber within the first and second raceways, a number of flanges 52 also preferably extend in opposed directions from the intermediate wall so as to extend into and over the first and second raceways.

The intermediate wall 56 preferably extends outwardly from those portions of the intermediate portion 26 of the tray nearest the fiber entry portion 24 and the connector portion 28. As such, the end portions of the slack loop 30 are divided into first and second raceways, while the side portions of the slack loop have a single raceway. However, the intermediate wall can extend outwardly from other portions of the tray between inner and outer walls, if so desired, without departing from the spirit and scope of the present invention. For example, an intermediate wall also preferably extends outwardly between the inner and outer walls of the connector portion of the fiber organizer of one advantageous embodiment in order to define separate raceways for the optical fibers which lead to each of the respective windows 32.

By defining first and second raceways, the fiber organizer 12 can establish different slack loops for different ones of the optical fibers. In addition, the fiber organizer defining first and second raceways can store different lengths of excess optical fiber by selectively routing the optical fiber through the first and/or second raceways.

By maintaining excess fiber within the slack loop 30 defined by the fiber organizer 12, the optical fibers can be reconnectorized or otherwise repaired without splicing. In order to further facilitate reconnectorization, the fiber organizer of the present invention preferably includes a receptacle 58 for cooperatively engaging and storing a spare connector, such as an SC connector. In the illustrated embodiment, the receptacle extends outwardly from the second surface of the tray such that the spare connector is stored in an unobtrusive manner within the optical receiver node 10. As shown in FIGS. 4 and 7, the receptacle preferably includes a wall 60 extending outwardly from the second surface of the tray to define a cavity sized to snugly receive the spare connector. In addition, the receptacle preferably includes a clip 62, such as a clip having a pair of opposed arms with enlarged distal portions, for securing engaging or grasping the spare connector. Thus, the fiber organizer stores all of the components necessary to reconnectorize an optical fiber, namely, excess lengths of the optical fibers and a spare connector for mounting upon end portions of the optical fiber.

The fiber organizer 12 of the present invention can be formed of a variety of materials and in a variety of manners without departing from the spirit and scope of the present invention. In one embodiment, however, the fiber organizer is formed of UVTEC Safe-FR 4010-1 polyolefin polypropylene which is injection molded within a single cavity mode in order to create a one-piece design. Although the fiber organizer of the illustrated embodiment is formed so as to be generally flat, the fiber organizer can be formed in a flexed or bent position as shown in FIG. 2 such that the intermediate portion 26 and the connector portion 28 of the fiber organizer are biased upwardly, if so desired.

Many modifications and other embodiments of the invention will come to mind to one skilled in the art to which this invention pertains having the benefit of the teachings presented in the foregoing descriptions and the associated drawings. Therefore, it is to be understood that the invention That which is claimed:

1. A fiber organizer for controllably routing at least one optical fiber within a housing that also includes at least one electrical circuit, the fiber organizer comprising:

a tray for supporting the at least one optical fiber and overlaying at least a portion of the electrical circuit within the housing;

inner and outer walls extending outwardly from said tray to define a raceway therebetween along which the at least one optical fiber is routed;

wherein the tray is pivotally mounted relative to the electrical circuit thereby allowing access to the electrical circuit underneath the tray; and wherein the tray is monolithic and is divided into a connector portion, an intermediate portion, and a fiber entry portion, the intermediate portion defining a reference plane relative to the housing, and the connector portion defining a plane parallel to and offset from the reference plane.

2. The fiber organizer of claim 1, further comprising:

an intermediate wall extending outwardly from the tray and disposed within the raceway between the inner and outer walls, the intermediate wall dividing the raceway into a first and second raceway, the first raceway being between the inner wall and the intermediate wall and the second raceway being between the intermediate wall and the outer wall.

3. The fiber organizer of claim 2, wherein the intermediate wall has at least two gaps therein, thereby allowing the at least one optical fiber to be routed between the first and second raceways to route slack in the at least one optical fiber in the raceways.

4. A fiber organizer according to claim 2 further comprising a plurality of flanges extending in opposed directions from said intermediate wall to thereby extend into both the first and second raceways.

5. A fiber organizer according to claim 1 wherein said inner and outer walls define a slack loop, wherein said tray comprises a fiber entry portion, and wherein the fiber organizer further comprises fiber retention means, mounted upon the fiber entry portion of said tray, for controllably routing the at least one optical fiber to the slack loop defined by said inner and outer walls.

6. A fiber organizer according to claim 1 wherein said inner and outer walls define a slack loop, wherein said tray comprises a connector portion, and wherein the fiber organizer further comprises fiber retention means, mounted upon said tray, for controllably routing the at least one optical fiber from the slack loop defined by said inner and outer walls to said connector portion.

7. The fiber organizer of claim 1, wherein the connector portion has means for rematably connecting optical fibers.

8. The fiber organizer of claim 7, wherein the means for rematably connecting optical fibers includes connector sleeves.

9. The fiber organizer of claim 1, wherein the tray has opposed first and second surfaces, the first surface supporting the at least one optical fiber and further comprises a receptacle extending outwardly from the second surface to engage a spare connector.

10. The fiber organizer of claim 1, further comprising a clip attached to the tray, the clip releasably securing the tray to the housing.

11. A fiber organizer for controllably routing at least one optical fiber within a housing that also includes at least one electrical circuit, the fiber organizer comprising:

a tray for supporting the at least one optical fiber and overlaying at least a portion of the electrical circuit within the housing;

inner and outer walls extending outwardly from said tray to define a raceway therebetween along which the at least one optical fiber is routed;

wherein the tray is pivotally mounted relative to tie electrical circuit thereby allowing access to the electrical circuit underneath the tray and wherein the tray further defines at least one opening aligned with a predetermined port of the electrical circuit to thereby permit electrical contact to be established with the predetermined port of the electrical circuit while the tray remains in position within the housing.

12. A fiber organizer for controllably routing at least one optical fiber within a housing, the fiber organizer comprising:

a tray for supporting the at least one optical fiber, the tray being divided into an intermediate portion and a connector portion, a surface of the intermediate portion defining a reference plane relative to the housing, and a surface of and the connector portion defining a plane parallel to and offset from the reference plane;

an inner wall extending outwardly from said tray in the intermediate portion and having a circumference;

an outer wall extending outwardly from said tray in the intermediate portion and spaced apart from and along at least a portion of the circumference of the inner wall;

an intermediate wall extending outwardly from the tray in the intermediate portion and disposed between the inner and outer walls, the intermediate wall defining a first and second raceway, the first raceway being between the inner wall and the intermediate wall and the second raceway being between the intermediate wall and the outer wall; and means for rematably connecting optical fibers disposed in the connector portion, the means being immediately adjacent a portion of the outer wall.

13. The fiber organizer of claim 12, wherein the intermediate wall has at least two gaps therein, thereby allowing the at least one optical fiber to be routed between the first and second raceways to route slack in the at least one optical fiber in the raceways.

14. A fiber organizer for controllably routing at least one optical fiber within a housing that also includes at least one electrical circuit, the housing having a lid, the fiber organizer comprising:

a tray for supporting the at least one optical fiber and overlaying at least a portion of the electrical circuit within the housing;

inner and outer walls extending outwardly from said tray to define a raceway therebetween along which the at least one optical fiber is routed;

a spring member extending around the fiber organizer from the housing to the lid to electrically connect the lid to ground; and wherein the tray is pivotally mounted relative to the electrical circuit thereby allowing access to the electrical circuit underneath the tray.

* * * * *